Jan. 1, 1963  W. T. RENTSCHLER  3,071,052
PHOTOGRAPHIC CAMERA WITH AUTOMATIC EXPOSURE SETTING
Filed April 27, 1960
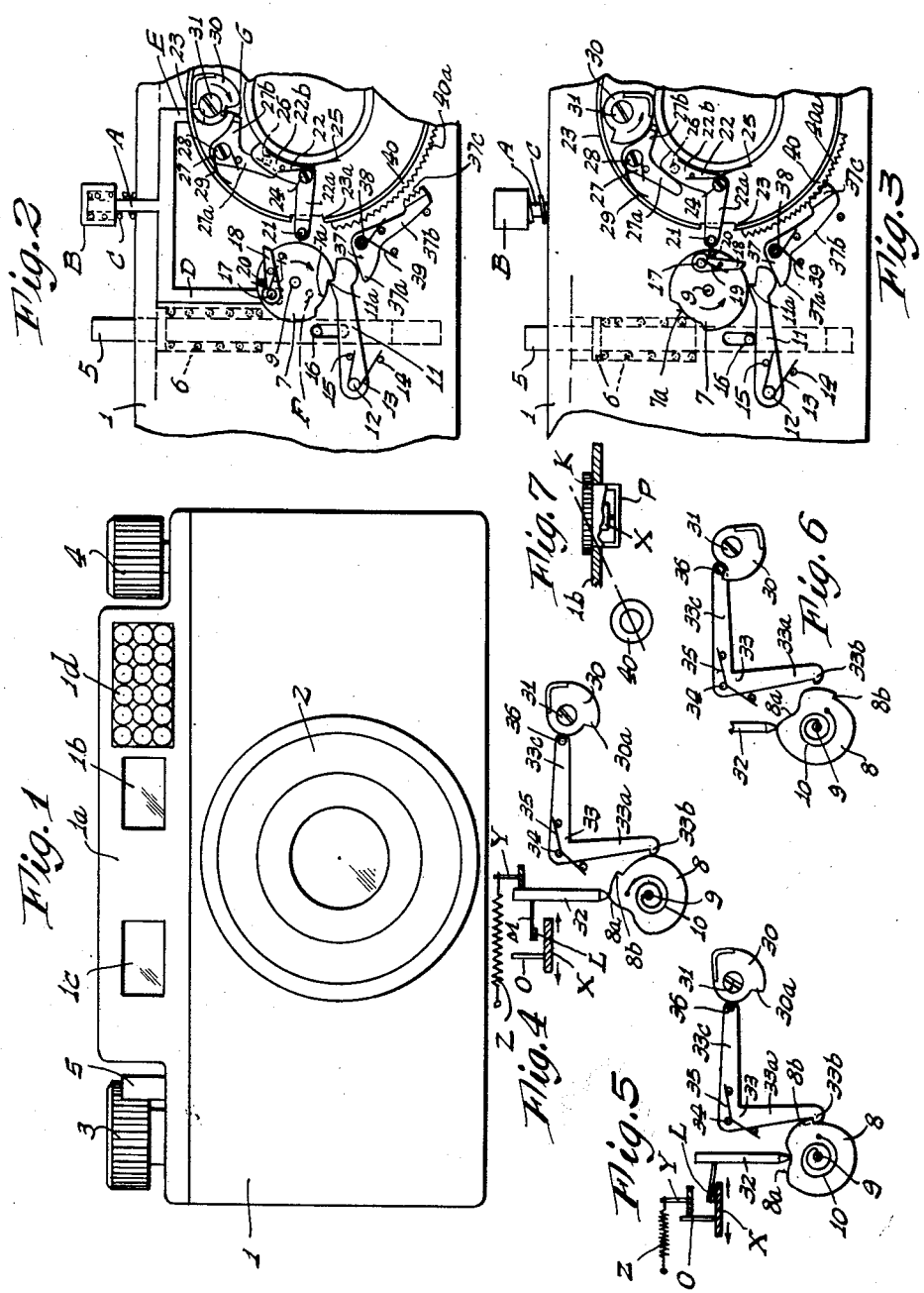
INVENTOR.
Waldemar T. Rentschler
BY
March, Gillette, Virgil & Eslinger
ATTORNEYS 3,071,052
Patented Jan. 1, 1963

3,071,052
PHOTOGRAPHIC CAMERA WITH AUTOMATIC EXPOSURE SETTING
Waldemar T. Rentschler, Calmbach (Enz), Germany, assignor to Alfred Gauthier, G.m.b.H., Calmbach (Enz), Germany, a corporation of Germany
Filed Apr. 27, 1960, Ser. No. 25,036
Claims priority, application Germany Apr. 29, 1959
4 Claims. (Cl. 95—10)

This invention relates to photographic cameras having automatic exposure setting means wherein there is a light-intensity measuring device provided with a movable member the position of which is regulated or adjusted by light conditions, said member being held or secured in its adjusted position in response to actuation of the camera or shutter release device and constituting a stop for an exposure setting member which latter is actuated or shifted by a powered drive.

In cameras of the above type, the task of fixing or securing the movable member of the light intensity measuring device in any of its adjusted positions requires comparatively strong or powerful clamping forces, and when the clamping or fixing device is to be returned or restored to its starting or inoperative position as the camera or shutter release device is freed from the actuating force, the restoring force which is required to overcome the clamping forces must be of such a magnitude that the resultant actuation of the camera release requires considerable force and the camera therefore has a noticeably "hard" release operation, which means that there is always the inherent risk of spoiling the picture due to movement of the camera when the exposure is being made.

The present invention obviates the above described drawback and disadvantage, and one object of the invention is to provide a novel and improved photographic camera of the aforementioned kind, which is simple in construction and reliable in operation, and which has a comparatively "soft" action insofar as the operation of the camera or shutter release device is concerned.

The above object is accomplished by the provision of a novel special driving member or means which has its own driving force and which is shifted to a loaded or cocked position in response to setting or cocking of the camera shutter, said driving member being released for operation under its driving force in response to actuation of the shutter or camera release. The said driving member is arranged to actuate or control the fixing or clamping means (also hereinafter called a "holding device") which acts on the movable member of the light intensity measuring device, and said driving member also operates to release the cocked exposure setting member which is cooperable with the clamped movable member, as well as to release the camera shutter.

In a camera constructed in accordance with the invention, the camera or shutter release device is thus merely used or needed to release the said driving member which has its own driving force, said driving member in turn actuating the fixing or holding device for the movable member of the light intensity measuring device, and the driving member additionally releasing the exposure setting member which cooperates with the fixed or clamped movable member and also effecting operation and release of the camera shutter. By such organization it is only necessary for a person operating the camera or shutter release to exert but relatively little force, and in consequence the camera is characterized by a "soft", desirable release operation.

In addition, in cameras of the above type, wherein the measuring mechanism or movement of the light intensity measuring device is made adjustable for the purpose of taking into account additional exposure influencing factors, special advantages are obtained by virtue of the fact that the restoration of the fixing or clamping means (holding device) which acts on the movable member of the light intensity measuring device takes place during the setting or cocking of the special driving member, in conjunction with the provision of a locking device which is cooperable with the setting members for the additional exposure factors, said locking device being so controlled by the special driving member that the said setting members are locked or secured at the latest at the moment when the fixing or clamping means for the movable member of the light intensity measuring device become operative, and such locking continues thereafter until the restoration of the clamping means has been completed.

This arrangement has the advantage of eliminating positively any possibility of the operator damaging the light intensity measuring device by attempting to adjust or shift the setting members for the other exposure factors at the time that the measuring mechanism is fixed or held against movement.

An additional operationally advantageous construction, in a camera as provided in accordance with the invention, is obtained by the provision of a locking device which is operable to retain or hold the released special driving member in an intermediate position which is its position corresponding to the operative position of the fixing or clamping means for the movable member of the light intensity measuring device. Such locking device is arranged to be released after the exposure has been effected, as for example, by means of a movable member of the shutter driving mechanism, the organization being such that the thus released special driving member restores the fixing or clamping means to its inoperative position during the final shifting movement of the special driving member.

An embodiment of the invention is illustrated, by way of example, in the accompanying drawings, in which:

FIG. 1 is a diagrammatic front elevational view of a photographic camera of the type having an intra-lens shutter assemblage, as provided by the invention.

FIG. 2 is a diagrammatic view showing, in elevation, the members or parts of the improved control device as provided by the invention, in cooperation with the main driving member of the intra-lens shutter assemblage, as well as the cooperation of the locking device under the control of the camera or shutter release device, all in conjunction with a manually operable exposure setting member. The various devices are in the positions associated with the set or cocked condition of the shutter.

FIG. 3 is a view like FIG. 2, but with the shutter released or not cocked.

FIG. 4 is a diagrammatic view showing additional parts or members, in elevation, of the present improved control device, said parts being those which actuate the fixing or clamping means for the movable member of the light intensity measuring device. The figure additionally illustrates the cooperation of the said control device with a locking device controlled by the main driving member of the shutter. The members are in the positions corresponding to the set or cocked condition of the shutter.

FIG. 5 is a view like FIG. 4, but showing the members in the positions occupied during a specific phase in the running down of the shutter, wherein the driving member is in an intermediate position.

FIG. 6 is a view like FIGS. 4 and 5, but showing the positions of the members corresponding to the released or uncocked condition of the shutter.

FIG. 7 is a diagrammatic representation of the measuring or instrument movement of an exposure regulator, carried by a wall or partition of the camera and mechanically coupled to an additional setting member of the camera.

Referring first to FIGS. 1, 2 and 3, the housing of the photographic camera is indicated by the numeral 1. Attached to the front wall of the housing 1 in a well known manner is a photographic intra-lens shutter assemblage 2. Operating knobs 3 and 4 for the film transport (advance) and film rewind are disposed on the top wall of the housing 1. Also, the top wall has a shutter release plunger 5 which is vertically movable, that is, movable in a direction perpendicular to the axis of the camera, against the action of a helical compression spring 6. In addition, there is housed in the top portion of the camera housing 1, under a cover cap 1a, a light intensity measuring device of a well known kind. The cover or cap 1a has windows 1b and 1c for a telemeter finder (a combined view finder and distance meter) which is coupled with the camera lens assemblage, and the cap 1a further has a honeycomb window 1d which is provided for a photoelectric cell of the light intensity measuring device.

The exposure meter having the light intensity measuring device, details of which are not shown herein since such details are not involved with the present invention, is constructed in a well known manner and comprises the aforementioned photoelectric cell which is located behind the honeycomb window 1d, further comprising a measuring mechanism or movement which is energized by current from the photocell. The movable member of the measuring mechanism, as for example the turnable or rotatable coil thereof is arranged to be clamped or held in various adjusted settings or positions in response to operation of the camera release 5, said moving coil serving as a stop for an exposure setting member which is automatically shifted by means of a powered driving device. The exposure setting member may be both an exposure value setting member and an exposure time (speed) or diaphragm setting member.

The measuring mechanism of the exposure regulator is shown diagrammatically in FIG. 7, said mechanism having a movable member or coil X, carried in a frame or part P which may be mounted on the cover 1a of the camera case 1 or a partition in the case or other suitable support. The frame P is rotatably adjustable in the wall or partition and has a wheel or transmission device K which is mechanically coupled to an additional setting member 40 of the camera (later to be mentioned), the arrangement being such that actuation and adjustment of the additional setting member 40 will result in a corresponding adjustment and turning of the frame P and the movable member X of the light intensity measuring device. The movable member X, for example, constitutes the movable coil of a galvanometer or equivalent instrument movement which is suitable for use as the measuring movement of the exposure regulator, as is well understood in the art.

In accordance with the invention, for the purpose of operating the fixing or holding device provided for the movable member or coil X of the light intensity measuring device, and for the purpose of effecting release of the exposure setting member (Y in FIGS. 4 and 5) which cooperates with the same, and release of the camera shutter there is provided a special driving member or means having its own driving force, said special driving member being shifted to a set or cocked position in response to setting or cocking of the camera shutter and being released for operation in response to actuation of the camera release plunger 5.

In the illustrated embodiment of the invention the special driving member comprises two rotary disks 7 and 8 fixed to each other and having a common bearing axle 9 provided on the camera housing, said disks being turnable as a unit but otherwise firmly or fixedly connected to each other. The driving force for the two disks is provided by a spiral coil spring 10 which at one end is affixed to the axle 9 and at the other end to the driving disk 8. The spring 10 biases the disks in the direction of the arrow shown in FIG. 2, that is, clockwise as viewed in this figure.

In conjunction with the special driving member comprising the disks 7 and 8 there is further provided a detent or pawl 11 which is pivotally mounted about an axle 12 provided in the camera housing 1, said pawl serving to detain the two disks 7 and 8 in their loaded or cocked positions. Acting on the pawl 11 is a spring 13 which is positioned about the axle 12, said spring at one end engaging a stationary pin 14 and at the other end engaging a pin 15 carried by the pawl whereby the latter is biased in a counter-clockwise direction as viewed in FIGS. 2 and 3. Such biasing tends to hold a projection 11a on the pawl 11 in an arcuate recess 7a provided on the disk 7. For the purpose of releasing the driving disks 7 and 8, the pawl 11 is pivotally movable out of engagement with the recess 7a of the disk 7 by means of a pin 16 affixed to the release plunger 5, said pin shifting downward and moving ahead of it the pawl 11 when the plunger 5 is depressed, this condition being illustrated in FIG. 3.

The disk 7 serves to release the camera shutter 2, whereas the disk 8 is arranged to actuate the fixing or holding device for the movable member of the light intensity measuring device. For these purposes, a unilaterally acting actuating pawl 18 is pivotally mounted on an axle 17 provided on the disk 7, the pawl 18 cooperating with an arresting lever arrangement which is adapted to retain the main driving member 30 of the shutter in its set or cocked position. The pawl 18 is acted on by a spring 19 which tends to maintain the pawl in engagement with a pin 20 provided on the disk 7. A second pin 21 is provided in the path of movement of the actuating pawl 18.

The carrier for the pin 21 is a two-armed lever 22 which is pivotally movable about an axle 24 provided in the housing 23 of the intra-lens shutter assemblage 2, the lever 22 being biased in a clockwise direction by a spring 25. One arm 22a of the lever 22 on which the pin 21 is carried, projects from the shutter housing 23 through a clearance slot 23a provided therein. The other arm 22b of the lever 22 carries a pin 26 which serves as an abutment for one arm 27a of an angle shaped member or bell crank 27 pivotally mounted about an axle 28 provided in the shutter housing 23 and biased by a spring 29. The lever 27 cooperates by means of its other arm 27b with the main driving member 30 of the shutter in a manner shown in FIG. 2. In the illustrated embodiment of the invention, the main driving member 30 of the shutter is constituted as a rotary disk which is positioned about an axle 31 in the shutter housing 23 and influenced and powered by a driving spring (not shown) acting in the direction of the arrow in FIG. 2. The setting or cocking of the main driving disk 30 takes place conjointly with the tensioning of the driving disks 7 and 8, during the transport or advance of the film as effected by the knurled knob 3.

Various structures may be employed to effect such simultaneous cocking of parts 7, 8 and 30. A diagrammatic representation of one means for effecting simultaneous cocking of the shutter drive disk 30 and the driving member 7, 8 is illustrated in FIGS. 2 and 3. This cocking means comprises a plunger A having an operating knob B, said plunger being biased outward of the top wall of the camera case 1 by a helical compression spring C. The plunger A is connected to pusher arms D and E which are respectively cooperable with pins F and G disposed on the driving member 7, 8 and the shutter drive 30 respectively. The ends of the pusher rods D and E may have flat surfaces for engagement with the pins F and G, and the organization is such that when the driving member 7, 8 and the shutter drive 30 are in the run-down positions, as indicated for example in FIG. 6, the operator need merely depress the button B and the plunger A in order to simultaneously cock or reset the driving member 7, 8 and the shutter drive disk 30.

To actuate the fixing or holding device for the movable member of the light intensity measuring device, the driving disk 8 has a circumferential cam 8a with which it engages a pin 32 under the action of a spring. Considering the pin 32 forming part of the fixing or holding device, all structures are not shown herein in detail; such device may be constructed in various well known ways.

One possible suggested arrangement suitable for illustrative purposes, for effecting this is diagrammatically illustrated in FIGS. 4 and 5. In these figures, the movable member of the light intensity measuring device is designated by the letter X and such member is indicated as being movable horizontally in either of opposite directions as shown by the oppositely pointing arrows in these figures. The holding device 32 includes a clamping shoe L which is carried by a resilient leaf spring M, said shoe being engageable with the movable member X when the holding device 32 is in its lowered position as shown in FIG. 5. For such engagement, the leaf spring M will be flexed slightly, as indicated. The holding device 32 is also engageable with the exposure setting member Y of the camera as indicated in FIG. 4. However, when the holding device plunger 32 is lowered, as indicated in FIG. 5, the exposure setting member Y will be freed for movement from right to left under the action of its driving or power means Z, shown in form of a helical extension spring. The exposure setting member Y is now impelled from right to left under the action of the spring Z, and is brought to a halt when it engages or abuts an upstanding lug O provided on the movable member X of the light intensity measuring device. Depending on the adjusted clamped position of the movable member X, the exposure setting member Y will accordingly be regulated, to properly set the camera for the exposure. After the driving disk 8 has been released, it is retained in an intermediate position (illustrated in FIG. 5) corresponding to the operative position of the fixing or holding device by a locking device which is released, after the exposure has been effected, by means of the main driving disk 30 of the shutter. When the driving disk 8 has been thus released, it functions during the remainder of its path of movement, to return the fixing or holding device to the inoperative position thereof, through the medium of the cam 8a (as illustrated in FIG. 6). The said locking device for retaining the released driving disk 8 in the intermediate position of FIG. 5 is, in the illustrated embodiment of the invention, a bell crank or angle shaped lever 33 which is pivotally mounted about an axle 34 provided in the camera housing and is influenced or biased in a clockwise direction as seen in the figures by a spring 35. One arm 33a of the lever 33 has a lug or projection 33b which is cooperable, in the manner shown in FIG. 5, with a projection or shoulder 8b of the driving disk 8. Affixed to the other arm 33c of the lever 33 is a pin 36 which is located in the path of movement of a shoulder 30a provided on the main driving disk 30. This causes the lever 33 to be pivoted, in the final stages of movement of the main driving disk 30, in clockwise direction from the locking position shown in FIG. 5 to an inoperative position as illustrated in FIG. 6 whereby the driving disk 8 is released for further running down movement in clockwise direction. The above-mentioned cocking of the driving member 7, 8 will, by virtue of the cam 8 and follower pin 32, reset the holding device L, M to the position shown in FIG. 4 wherein the movable member X is released.

The position of the movable member X of the light intensity measuring device, and the extent of the path of movement which is to be traveled by the exposure setting member Y in the case of an automatic exposure setting, depends on the intensity of the light which prevails during the exposure, as well as on the setting of additional exposure influencing factors. When setting the movable member of the light intensity measuring device, allowance may be made for said factors in a manner known per se, by rotatably adjusting the measuring mechanism or movement as diagrammatically shown in FIG. 7. However, to avoid damaging the measuring mechanism, the same is arranged to be adjusted only if its movable member is free or disengaged from the fixing or clamping means, i.e. if the latter is in its inoperative position.

In order to insure this safety of the measuring mechanism as above outlined, without requiring the slightest attention on the part of the operator, a further construction as provided by the invention embraces the use of a locking device, which cooperates with the setting members for the other exposure factors and which is so controlled by the driving disks 7, 8 that the setting members are locked at the latest from the moment at which the fixing or clamping means for the movable member of the light intensity measuring device becomes operative and remain so locked until after the fixing or clamping means has been returned or restored to its inoperative condition.

Such a locking device is illustrated in FIGS. 2 and 3 of the embodiment. It comprises a two-armed lever 37 which is pivotally mounted about an axle 38 provided in the camera housing 1, said lever being biased in a clockwise direction by a spring 39. Due to the action of the spring 39, one arm 37a of the lever 37 is made to engage the pawl 11 of the driving disk 7, whereas the other arm 37b cooperates with an additional exposure setting member 40. This cooperation is effected in such a manner that the arresting lever 37 is lifted off or away from the exposure setting member 40 for the conditions where the shutter disk 30 and the driving disks 7, 8 (FIG. 2) are cocked or set. Upon actuation of the release plunger 5, the arresting lever 37 is pivoted under the action of the pawl 11, into the locking position shown in FIG. 3, wherein its arm 37b engages the periphery of the setting member 40, and secures the same against undesired movement. The lever 37 is kept in its locking position by means of the pawl 11 until after the shutter disk 30 and the driving disks 7, 8 have been set or cocked, by virtue of the said pawl being engaged with the periphery of the driving disk 7. For the purpose of increasing the locking effect, the mutually engaging surfaces of the arresting lever 37 and the exposure setting member 40 are each provided with notches or indentation 37c and 40a respectively.

The exposure setting member Y which cooperates with the fixing or clamping means L, M, 32 for the movable member X of the light intensity measuring device, and the driving device Z for such setting member are only shown schematically; further details involving the cooperation between said setting member and the driving member 7, 8 are not shown for the sake of clarity of illustration. Release of the setting member Y when it is in the cocked position may, for example, be effected instead by means of the actuating pawl 18 of the driving disk 7 prior to the release of the shutter. With such organization the required delay between the release of the exposure setting member Y and the initiation of release of the shutter may be brought about in a manner well known by means of a conventional escapement mechanism. The duration of the delay is so selected that the exposure setting member Y which is controlled by the light intensity measuring device may travel the maximum extent of movement permitted it, within the said duration of delay.

I claim:

1. In a photographic camera of the type provided with an automatic exposure setting means including a light intensity measuring device having a movable member and a holding device for securing said member in different adjusted positions in response to actuation of the camera release, and including an exposure setting member having a powered driving means, said setting member being halted in its path of travel by said movable member, the improvement which comprises a movable driving member and powered driving means for the same, carried by the camera; means on the camera, for cocking said driving member simultaneously with cocking of the camera shutter; releasable means for holding cocked said driving member; means for actuating said releasable means to release said driving member in response to actuation of the camera release; means responsive to release and running down of the driving member for actuating the holding device to secure the said movable member in adjusted position; and means responsive to release and running down of the driving member, for effecting release of the exposure setting member.

2. The invention as defined in claim 1, in which the measuring device of the exposure setting means is adjustable to take into account an additional exposure factor, in which the holding device is reset to release the movable member in response to cocking of the driving member, in which there is an additional setting member and means actuated thereby for adusting said measuring device, and in which there is a locking device actuated by the driving member for locking the additional setting member in response to running down of the driving member, at a time not later than the instant that the holding device is actuated to secure the movable member, and at least until the resetting of the holding device.

3. A camera as in claim 1, in which there is a locking device for retaining the released driving member in an intermediate position corresponding to the operative position of the holding device, and in which there are means for rendering inoperative said locking device only after completion of the exposure, in response to movement of a member of the shutter drive mechanism, and in which there are means for actuating the holding device to inoperative position in response to completion of movement of the released driving member.

4. In a photographic camera of the type provided with an automatic exposure setting means including a light intensity measuring device having a movable member and a holding device for securing said member in different adjusted positions in response to actuation of the camera release, and including an exposure setting member having a powered driving means, said setting member being halted in its path of travel by said movable member, the improvement which comprises a movable driving member and powered driving means for the same, carried by the camera; means on the camera, for cocking said driving member simultaneously with cocking of the camera shutter; releasible means for holding cocked said driving member; means for actuating said releasible means to release said driving member in response to actuation of the camera release; means responsive to release and running down of the driving member for actuating the holding device to secure the said movable member in adjusted position; means responsive to release and running down of the driving member, for effecting release of the exposure setting member; and means responsive to release and running down of the driving member, for effecting release of the cocked camera shutter.

References Cited in the file of this patent
UNITED STATES PATENTS

| | | |
|---|---|---|
| 2,188,820 | Riszdorfer | Jan. 30, 1940 |
| 2,868,095 | Gebele | Jan. 13, 1959 |
| 2,925,760 | Broachke | Feb. 23, 1960 |
| 2,949,070 | Frost | Aug. 16, 1960 |